US010853724B2

(12) United States Patent
Xiao et al.

(10) Patent No.: US 10,853,724 B2
(45) Date of Patent: Dec. 1, 2020

(54) SYMBOLIC PRIORS FOR RECURRENT NEURAL NETWORK BASED SEMANTIC PARSING

(71) Applicant: Xerox Corporation, Norwalk, CT (US)

(72) Inventors: Chunyang Xiao, Grenoble (FR); Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 791 days.

(21) Appl. No.: 15/612,098

(22) Filed: Jun. 2, 2017

(65) Prior Publication Data

US 2018/0349767 A1    Dec. 6, 2018

(51) Int. Cl.
| | |
|---|---|
| *G06N 3/02* | (2006.01) |
| *G06N 3/08* | (2006.01) |
| *G06N 3/04* | (2006.01) |
| *G06N 7/00* | (2006.01) |
| *G06F 40/30* | (2020.01) |
| *G06F 40/216* | (2020.01) |
| *G06F 40/289* | (2020.01) |

(52) U.S. Cl.
CPC ............. *G06N 3/08* (2013.01); *G06F 40/216* (2020.01); *G06F 40/289* (2020.01); *G06F 40/30* (2020.01); *G06N 3/0445* (2013.01); *G06N 7/005* (2013.01); *G06N 3/02* (2013.01)

(58) Field of Classification Search
CPC ...................................................... G06N 3/02
See application file for complete search history.

(56) References Cited

U.S. PATENT DOCUMENTS

| | | |
|---|---|---|
| 5,606,646 A | 2/1997 | Khan et al. |
| 5,748,848 A | 5/1998 | Tresp |
| 6,792,413 B2 | 9/2004 | Tani |
| 6,985,852 B2 | 1/2006 | Wang |
| 7,464,032 B2 | 12/2008 | Wang |
| 7,555,426 B2 | 6/2009 | Wang |
| 8,160,978 B2 | 4/2012 | Schafer et al. |
| 8,364,696 B2 | 1/2013 | Hall et al. |

(Continued)

OTHER PUBLICATIONS

Jia, et al., Data Recombination for Neural Semantic Parsing, Proceedings of the 54th Annual Meeting of the Association for Computational Linguistics (vol. 1: Long Papers), 2016, pp. 12-22 (Year: 2016).*

(Continued)

*Primary Examiner* — Wilbert L Starks
(74) *Attorney, Agent, or Firm* — Ortiz & Lopez, PLLC; Kermit D. Lopez; Luis M. Ortiz

(57) ABSTRACT

Methods, systems, and devices for semantic parsing. In an example embodiment, a method for semantic parsing can include steps, operations, or instructions such as obtaining a data pair for learning, the data pair comprising logical form data and natural utterance data; acquiring grammar for targeted logical forms among the logical form data of the data pair; modeling data comprising other available prior knowledge utilizing WFSA (Weighted Finite State Automata); combining with the targeted logical forms with the data modeled comprising the other available prior knowledge to form a background; and exploiting the background on the data pair. Note that we do not "learn" the background, but "learn" the background-RNN (Recurrent Neural Network).

20 Claims, 3 Drawing Sheets

(56) References Cited

U.S. PATENT DOCUMENTS

| | | | |
|---|---|---|---|
| 8,554,707 | B2 | 10/2013 | Schafer et al. |
| 9,015,095 | B2 | 4/2015 | Ito |
| 9,026,431 | B1 | 5/2015 | Moreno Mengibar et al. |
| 9,495,633 | B2 | 11/2016 | Davis et al. |
| 9,606,897 | B2 | 3/2017 | Lehavi et al. |
| 2013/0204815 | A1 | 8/2013 | Grothmann et al. |
| 2015/0110597 | A1 | 4/2015 | Dull et al. |
| 2015/0364127 | A1 | 12/2015 | Zhao et al. |
| 2016/0048753 | A1 | 2/2016 | Sussillo et al. |
| 2017/0053646 | A1 | 2/2017 | Watanabe et al. |
| 2017/0076196 | A1 | 3/2017 | Sainath et al. |
| 2017/0091169 | A1 | 3/2017 | Bellegarda et al. |
| 2017/0103303 | A1 | 4/2017 | Henry et al. |
| 2017/0103312 | A1 | 4/2017 | Henry et al. |

OTHER PUBLICATIONS

Li, Logical Parsing from Natural Language Based on a Neural Translation Model, International Conference of the Pacific Association for Computational Linguistics, (PACLING 2017), 2017, pp. 1-6 (Year: 2017).*

Zilka, Dissertation Proposal: Dialog Management with Deep Neural Networks, Charles University in Prague, 2015, pp. 1-20 (Year: 2015).*

Bar-Hillel, Y. et al., On formal properties of simple phrase structure grammars, Z. Phonetik, Sprachwiss. Kommunikationsforsch (1961) 41:143-172.

Berant, J. et al., Semantic Parsing on Freebase from Question-Answer Pairs, EMNLP (2013) pp. 1533-1544.

Berant, J. et al., Semantic Parsing via Paraphrasing, ACL (2014) pp. 1415-1425.

Clark, S. et al., Wide-Coverage Efficient Statistical Parsing with CCG and Log-Linear Models, Computational Linguistics (2007) 33(4):493-552.

Dong, L. et al., Language to Logical Form with Neural Attention, Proceedings of the 54th Annual Meeting of the Associate for Computational Linguistics (2016) Berlin, Germany, Aug. 7-12, pp. 33-43.

Dyer, C., A formal model of ambiguity and its applications in machine translation, Dissertation, University of Maryland (2010, 252 pages.

Dymetman, M. et al., Log-Linear RNNs: Towards Recurrent Neural Networks with Flexible Prior Knowledge, CoRR (2016) abs/1607.02467, 28 pages.

Goyal, R. et al., Natural Language Generation through Character-Based RNNs with Finite-State Prior Knowledge, Proceedings of COLING 2016, the 26th International Conference on Computational Linguistics: Technical Papers, Osaka, Japan, Dec. 11-17, pp. 1083-1092.

Hochreiter, S. et al., Long Short-Term Memory, Neural Computation (1997) 9(8):1735-1780.

Hu, Z. et al., Harnessing Deep Neural Networks with Logic Rules, ACL (1), 2016, 13 pages.

Jia, R. et al., Data Recombination for Neural Semantic Parsing, Proceedings of the 54th Annual Meeting of the Association for Computational Linguistics (2016) Berlin, Germany, Aug. 7-12, pp. 12-22.

Kwiatkowski, T. et al., Scaling Semantic Parser with on-the-fly Ontology Matching, Proceedings of the 2013 Conference on Empirical Methods in Natural Language Processing, Seattle, WA, Oct. 18-21, pp. 1545-1556.

Liang, C. et al., Neural Symbolic Machines: Learning Semantic Parsers on Freebase with Weak Supervision, CoRR, abs/1611.00020, 2016, 12 pages.

Mou, L. et al., Coupling Distributed and Symbolic Execution for Natural Language Queries, CoRR, abs/1612.02741, 2016, 8 pages.

Nederhof, M.-J. et al., Probabilistic Parsing as Intersection, Proc. 8th International Workshop on Parsing Technologies (2003) 12 pages.

Neelakantan, A. et al., Learning a Natural Language Interface with Neural Programmer, CoRR, abs/1611.08945, 2016, 13 pages.

Pasupat, P. et al., Compositional Semantic Parsing on Semi-Structure Tables, ACL (1), 2015, 11 pages.

Pereira, F. C. N. et al., Definite Clause Grammars for Language Analysis—A Survey of the Formalism and a comparison with Augmented Transition Networks, Artificial Intelligence (1980) 13:231-278.

Reddy, S. et al., Large-scale Semantic Parsing without Question-Answer Pairs, Transactions of the Association for Computational Linguistics (2014) 2:377-392.

Russell, S. et al., (eds.), Artificial Intelligence a Modern Approach, Second Edition (2003) Prentice Hall, Upper Saddle River, NJ, 88 pages.

Salakhutdinov, R. et al., Learning with Hierarchical-Deep Models, IEEE Transactions on Pattern Analysis and Machine Intelligence (2013) 35(8):1958-1971.

Srivastava, N. et al., Dropout: A Simple Way to Prevent Neural Networks from Overfitting, Journal of Machine Learning Research (2014) 15:1929-1958.

Stolcke, A., An Efficient Probabilistic Context-Free Parsing Algorithm that Computes Prefix Probabilities, Computational Linguistics (1995) 21(2):165-201.

Wang, Y. et al., Building a Semantic Parser Overnight, Annual Meeting of the Association for Computational Linguistics and the 7th International Joint Conference on Natural Language Processing of the Asian Federation of Natural Language Processing, ACL vol. 1: Long Papers (2015) pp. 1332-1342.

Xiao, C. et al., Sequence-based Structure Prediction for Semantic Parsing, Proceedings of the 54th Annual Meeting of the Association for Computational Linguistics (2016), Berlin, Germany, Aug. 7-12, pp. 1341-1350.

* cited by examiner

```
⎡ s0:        s(s) → np(S).
⎢ np0:       np (get [CP,NP]) → np(NP), cp(CP).
⎢ np1:       np (NP) → typenp (NP).
⎢ cp0:       cp ([lambda, s, [filter, s, RELNP, =, ENTNP, =, ENTNP] ] ) →
⎢                [whose], relnp (RELNP), [is], entitynp (ENTNP).
⎢ . . .
⎢ typenp0:   typenp (article) → [article].
⎢ relnp0:    relnp (pubDate) → [publication, date]
⎢ entitynp0: entitynp (1950) → [1950].
⎣ . . .
```

↙ 10

SYMBOLIC PRIORS FOR RECURRENT NEURAL NETWORK BASED SEMANTIC PARSING

TECHNICAL FIELD

Embodiments are related to data-processing methods and systems. Embodiments are also related to the field of natural language understanding and semantic parsing. Embodiments additionally relate to neural networks, and in particular, recurrent neural networks.

BACKGROUND

In natural language understanding, a computer system receives a string of input text and attempts to identify a semantic meaning represented by the input text. In many systems, this can be achieved by parsing the input text into semantic tokens and then combining the semantic tokens to form larger tokens until a single token spans the entire text segment.

Speech recognition systems can translate spoken words into text in a process that is known as automatic speech recognition. Some speech recognition systems use training where an individual speaker reads sections of text and the speech recognition system uses the terms and phrases spoken by the user to select a recognition algorithm particular to the speaker.

A semantic parser may analyze a string of n-grams according to a formal grammar to identify characteristics of the n-grams. For example, a semantic parser may analyze a sentence or a phrase to determine the syntactic relationship between the different n-grams in the sentence or the phrase.

The n-grams may be a contiguous sequence of n items from a given sequence of text. Each of the n items can be phonemes, syllables, letters, words, numerals, or base pairs to name a few examples. The value of n can vary, such as one for a unigram, two for a bi-gram, and so on.

To construct a semantic parser, the designer of the parser must identify the words and/or semantic tokens that can be represented by a higher-level semantic token. For the conversion from words to semantic tokens, this involves identifying the different words that a user could use to express the semantic idea represented by the semantic token.

Learning to map natural language utterances (NLs) to logical forms (LFs) is thus a process known as semantic parsing, which has received a great deal of attention in recent years, particularly in the context of constructing Question-Answering systems. Traditional systems exploit rich prior knowledge in the form of features and grammars to build models. This type of knowledge facilitates generalization on test data but often fails to adapt to the actual regularities present in the data. For example, some solutions have proposed using a CCG parser to construct a model that achieves satisfactory results; however, for the WebQuestions dataset, it has been observed that 25% of system failures are due to the fact that a sentence cannot be parsed by the CCG parser.

While it is difficult to manually design appropriate features for a specific dataset, one would like a system to discover those features automatically given enough data. Recent semantic parsing systems explore this direction and propose to use recurrent neural networks (RNNs) and particularly LSTMs based deep learning models to learn a semantic parser. Despite their relative success, these neural models also have clear drawbacks, for instance, the difficulty in handling unknown words. More generally, deep models are very data greedy and do not perform well on cases rarely seen in training.

There have been some recent attempts to combine prior knowledge with neural networks in an NLP context. In the context of Natural Language Generation (NLG), one attempt involves an RNN model that generates sentences character-by-character, conditional on a semantic input. This approach uses a form of prior knowledge, which is referred to as a "background", to guide the RNN in producing string of characters which are (i) valid common English words or (ii) "named entities" (e.g. hotel names, addresses, phone numbers) for which evidence can be found in the semantic input. In the context of Semantic Parsing, some solutions have proposed the use of an RNN-based model to predict derivation sequences (DS) that are derivation steps relative to an a priori given underlying grammar. The grammar is used to incrementally filter out those derivation steps that may lead to noninterpretable LFs, which is difficult for the RNN to learn on its own.

While the "background" described above is partially based on its actual semantic input, the prior employed only exploits knowledge about output well-formedness. In both cases (NLG and Semantic Parsing) however, the output depends on the input. In semantic parsing, if the input question contains the string 'Barack Obama,' it is highly likely that the LF of that question involves the entity Barack Obama and therefore, that the rule expanding to "Barack Obama" is present in the output derivation sequence.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods, systems, and devices for semantic parsing.

It is another aspect of the disclosed embodiments to provide symbolic priors for RNN (Recurrent Neural Network) based semantic parsing.

It is yet another aspect of the disclose embodiments to provide for methods, systems, and devices for building a semantic parser.

The aforementioned aspects and other objectives and advantages can now be achieved as described herein. Methods, systems, and devices for semantic parsing are disclosed herein. In an example embodiment, a method for semantic parsing can include steps, operations, or instructions such as obtaining a data pair for learning, the data pair comprising logical form data and natural utterance data; acquiring grammar for targeted logical forms among the logical form data of the data pair; modeling data comprising other available prior knowledge utilizing WFSA (Weighted Finite State Automata); combining with the targeted logical forms with the data modeled comprising the other available prior knowledge to form a background; and exploiting the background on the data pair. Note that we do not "learn" the background, but do "learn" the background-RNN (Recurrent Neural Network).

The background may be a neural network such as an RNN (Recurrent Neural Network). It can be appreciated that the background discussed herein is not limited to only an RNN.

That is, the background can be implemented in the context of, for example, WFSA (Weighted Fine-State Automata).

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figures 1, 2:
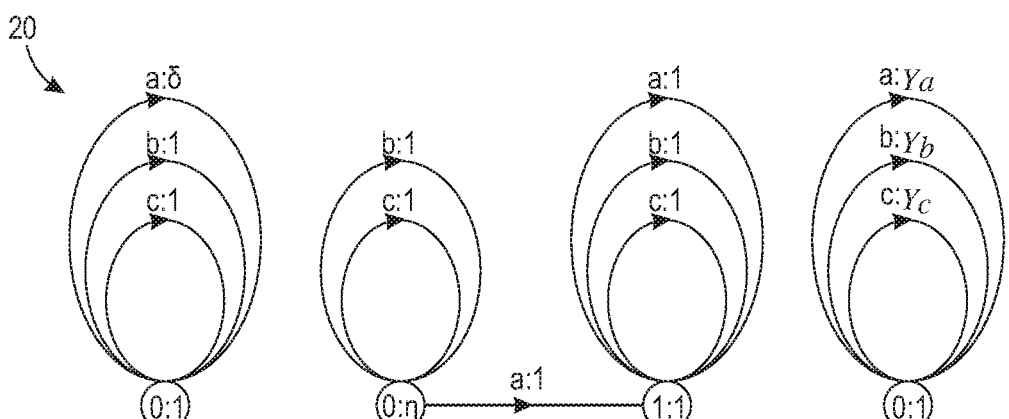
FIG. 1 illustrates an example of some general rules (top) and domain-specific rules (bottom) of the Overnight in DCG format, in accordance with an example embodiment.
FIG. 2 illustrates a schematic diagram depicting three example WFSA's for handling different types of prior information, in accordance with example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation."

The disclosed embodiments are based on a semantic parsing approach involving the use of a background prior that combines particular grammatical constraints with certain types of prior beliefs, which can be extracted from the NL question. Combining different sources of prior knowledge, which can also be seen as combining different factors in a graphical model, is a difficult problem. In general, to compute the exact combination (with even two factors), one does not have other solutions than to go through an exhaustive enumeration of both factors and multiplying each pair of factors.

The disclosed solution to this problem as discussed herein is to implement an input-dependent background through weighted finite-state automata (WFSAs), which can then be intersected with WCFG (Weighted Context-Free Grammar) representing valid grammar derivations. Note that WCFG is a context-free grammar where each production has a numeric weight associated with it. The weight of a specific parse tree in a WCFG is the product or sum of all rule weights in the tree. Each rule weight can be included as often as the rule is used in the tree.

Intersecting a WFSA with a WCFG can be accomplished through a dynamic programming procedure, which is efficient because it avoids exhaustive enumeration. The result of this intersection algorithm is a new WCFG, which can be normalized into a PCFG (Probabilistic CFG), which makes explicit the conditional probabilities for the different ways in which a given derivation sequence can be continued when making its next local choice. The RNN has only to learn to "correct" the choices of the PCFG. In the cases where the background is close to the true distribution, the RNN will learn to predict a uniform distribution thus always referring to the background for such predictions.

This is in fact a desirable behavior because the background may contain prior knowledge that the RNN is not able to learn based on data (e.g., prior knowledge on entities unseen in training) and the best behavior for the model in those cases is to refer to the background.

The new Background RNN semantic parser discussed herein can be tested on an extended version of the Overnight dataset, which removes certain problematic aspects of the original dataset (this may make the results too optimistic, as discussed in further detail herein). By incorporating simple input-dependent prior knowledge via WFSAs, the disclosed model not only improves over its RNN baseline, but also over previous non-RNN systems, which involve much richer hand-crafted features.

One way to construct a semantic parser involves building datasets for training a semantic parser without having to manually annotate natural language sentences with logical forms (LFs). A non-limiting example of such an approach is disclosed in Wang et al., 2015 (Yushi Wang, Jonathan Berant, & Percy Liang; "Building a Semantic Parser Overnight," *Annual Meeting of the Association for Computational Linguistics and the 7th International Joint Conference on Natural Language Processing of the Asian Federation of Natural Language Processing*, ACL Volume 1: Long Papers, pages 1332-1342, 2015), which we refer to as "SPO".

FIG. 1 illustrates an example 10 of some general rules (top) and domain-specific rules (bottom) of the Overnight in DCG (Definite Clause Grammars) format, in accordance with an example embodiment. First, a grammar (an example extract is shown in FIG. 1, in the DCG format) can be used to generate LFs paired with conventional surface realizations called "canonical forms" (CFs). For example, the sample rules shown in FIG. 1 can be utilized to support the generation of the LF get[[lambda,s,[filter,s,pubDate,=, 1950]],article] along with the CF "article whose publication date is 1950".

The CFs are not necessarily natural English, but are supposed to be "semantically transparent" so that one can use crowd sourcing to paraphrase those CFs into natural utterances (NLs), e.g., Articles published in 1950. The resulting (NL, LF) pairs make up a dataset, which can be used for learning semantic parsers.

After collecting all the paraphrases, the authors of SPO constructed a dataset divided into training and test sets by performing a random 80%-20% split over all the (NL, LF) pairs. However, given the data collecting process, each LF tends to correspond to several (in general more than 5) paraphrases. In consequence, inside this original dataset, most of the LFs in the test set have already been seen in training, making the task close to a classification process and easier than it should be.

In addition, the original dataset contains very few named entities. In the disclosed approach, we therefore construct a new dataset called Overnight+ fixing some of the above issues. More details regarding the proposed dataset are discussed herein.

To learn the semantic parser, SPO first trains a log-linear model based on rich prior features dependent jointly on NL and the corresponding (LF, CF) pair. Then it searches for the derivation tree relative to the grammar for which the produced (LF, CF) pair has the highest score. In contrast, it has been proposed to use RNN-based models to directly map the NL to its corresponding derivation sequence (DS). Derivation sequences are sequentialized representations of derivation trees in the grammar. For example, the derivation tree generating the CF "article whose publication date is 1950" is s0(np0(np1(typenp0),cp0(relnp0,entitynp0))). The associated DS is the leftmost traversal of this tree: s0,np0,np1, typenp0,cp0,relnp0,entitynp0.

Predicting DS provides an efficient sequentialization and makes it easy to guarantee the well-formedness of the predicted sequence. Xiao et al. [2016] (Chunyang Xao, Marc Dymetman, and Claire Gardent. "Sequence-based structured prediction for semantic parsing" in ACL(1), 2016) show that their model "Derivation Sequence Predictor with Constraints Loss" (DSP-CL) achieves good performance on the original Overnight dataset.

The disclosed approach can be seen as extending DSP-CL by integrating some input-dependent prior knowledge into the RNN predictor, allowing it to improve its performance on the more challenging Overnight+ dataset.

In the context of NLG, a standard generative procedure of RNNs may be described as follows:

$$p_\theta(x_{t+1}|x_1, \ldots, x_t, C) = \text{rnn}_\theta(x_{t+1}|x_1, \ldots, x_t, C)$$

where C is the observed input context (i.e., the input of a seq2seq model), $x_1, \ldots, x_t$ the current prefix, $\text{rnn}_\theta$ the softmax output of the RNN parameterized by $\theta$, and $p_\theta$ the probability distribution from which the next symbol $x_{t+1}$ can be sampled. It can be modified as follows, into what can be referred to as a background RNN:

$$p_\theta(x_{t+1}|x_1, \ldots, x_t, C) \propto b(x_{t+1}|x_1, \ldots, x_t, C) \cdot \text{rnn}_\theta (x_{t+1}|x_1, \ldots, x_t, C), \quad (1)$$

where the background b is an arbitrary non-negative function over C, $x_1, \ldots, x_t, x_{t+1}$, which is used to incorporate prior knowledge about the generative process $p_\theta$. One extreme, taking b to be uniform corresponds to the situation where no prior knowledge is available, and one is back to a standard RNN with all the discriminating effort falling on the rnn component and relying on whatever (possibly limited) training data is available in each context; on the other extreme, if the true process p is known, one make take b=p, and then the rnn component $\text{rnn}_\theta(x_{t+1}|x_1, \ldots, x_t, C)$ is only required to produce a close-to-uniform distribution over the target vocabulary, independently of $x_1, \ldots, x_t, C$, which only requires the layer just before the softmax to produce a close-to-null vector, which is an easy task to learn (by assigning close-to-null values to some matrices and biases).

In practice, the interesting cases fall between these two extremes, with the background b incorporating some prior knowledge that the rnn component can leverage in order to more easily fit the training data. In some NLG applications, the output of the seq2seq model may be a string of characters, and the background—implemented as a WFSA over characters—can be used to guide this output: (i) towards the production of valid common English words, and (ii) towards the production of named entities (e.g., hotel names, addresses, etc.) for which evidence can be found in the semantic input.

The approach of Xiao et al. [2016] can be reformulated into such a "Background-RNN" (BRNN) framework. In this case, the underlying grammar G can act as a yes-no filter on the incremental proposals of the RNN, and this filtering process guarantees that the evolving DS prefix always remains valid relative to G. This can be considered as follows:

$$p_\theta(x_{t+1}|x_1, \ldots, x_t, C) \propto b(x_{t+1}|x_1, \ldots, x_t) \cdot \text{rnn}_\theta (x_{t+1}|x_1, \ldots, x_t, C), \quad (2)$$

where C=NL is the input question, the $X_i$'s are rule-names, and b takes a value in $\{0,1\}$, with $b(x_{t+1}|x_1, \ldots, x_t)=1$ indicating that $x_1, \ldots, x_t, x_{t+1}$ is a valid DS prefix relative to G. With this mechanism in place, on the one hand the BRNN cannot produce "ungrammatical" (in the sense of being valid according to the grammar) prefixes, and on the other hand it can exploit this grammatical knowledge in order to ease the learning task for the rnn component, which is not responsible for detecting ungrammaticality on its own anymore.

While the (implicit) background of Xiao et al., 2016 shown in (2) is a binary function that does not depend on the NL input, but only on hard grammaticality judgments, in the disclosed embodiments, it is proposed to use the more general formulation (1). Now b is soft rather than hard and it does exploit the NL input.

More specifically, $b(x_{t+1}|x_1, \ldots, x_t, NL)$ is obtained in the following manner. First, we use the original grammar G together with the input NL to determine a WCFG (Weighted Context-Free Grammar) $GW_{NL}$ over derivation sequences of the original CFG (i.e., the terminals of $GW_{NL}$ are rule-names of the original G), as will be explained below. Second, we can compute $b(x_{t+1}|x_1, \ldots, x_t, NL)$ as the conditional probability relative to $GW_{NL}$ of producing $x_{t+1}$ in the context of the prefix $x_1, \ldots, x_t$.

Our training set is composed of pairs of the form (NL, DS); the $rnn_\theta$ component of the BRNN (1) is a seq2seq LSTM-based network in which the input encoding is a vector based on the unigrams and bigrams present in NL and where the DS output is a sequence of rule-names from G; the log it-output layer of this network is then combined additively with the log b before a softmax is applied, resulting in the probability distribution $p_\theta(x_{t+1}|x_1, \ldots, x_t, NL)$. Finally, the incremental cross-entropy loss of the network $-\log p_\theta(\bar{x}_{t+1}|x_1, \ldots, x_t, NL)$ is propagated through the network (where $\bar{x}_{t+1}$ is the observation in the training data). Implementation details will be discussed in greater detail herein.

It is still desired for our background to ensure grammaticality of the evolving derivation sequences, but in addition we wish it to reflect certain tendencies of these sequences, which may depend on the NL input. By stating these tendencies through a real-weighted, rather than binary, background $b(x_{t+1}| \ldots )$, we make it possible for the rnn component to bypass the background preferences in the presence of a training observation $x_{t+1}$ that does not agree with them, through giving a high enough value to $rnn_\theta(x_{t+1}| \ldots )$.

Our approach is then the following. We begin by constructing a simple WCFG $GW_O$ that (1) enumerates exactly the set of all valid derivation sequences relative to the original G, and (2) gives equal weight $1/n_{NT}$ to each possible $n_{NT}$ expansions of each of its non-terminals NT. Thus, $GW_O$ is actually a Probabilistic CFG (PCFG), that is, a WCFG that has the property that the sum of weights of the possible rules expanding a given nonterminal is 1. Thus, $GW_O$ basically ensures that the strings of symbols it produces valid DS's relative to G, but is otherwise non-committal concerning different ways of extending each prefix.

The second step involves constructing, possibly based on the input NL, a small number of WFSA's (weighted FSA's) each of which represents a certain aspect of the prior knowledge we have about the likely output sequences. These automata will be considered as "factors" (in the sense of probabilistic graphical models") that will be intersected (In other words, multiplied) with $GW_0$, resulting in a final WCFG $GW_{NL}$, which will then combine the different aspects and be used as our background. In FIG. 2, we illustrate three possible such automata; here the output vocabulary is composed of the symbols a, b, c, . . . (in our specific case, they will actually be DS symbols, but here we keep the description generic). FIG. 2 illustrates a schematic diagram 20 depicting three example WFSA's for handling different types of prior information, in accordance with example embodiment. In FIG. 2, edge labels can be written in the form symbol: weight. The initial state is 0. The final states are indicated by a double circle and their exit weight is also indicated.

Let us first describe the automaton on the left. Here each symbol appears on an edge with weight 1, with the exception of the edge associated with a, which carries a weight $\delta^k \ll 1$; this automaton thus gives a "neutral" weight 1 to any symbol sequence that does not contain a, but a much smaller weight $\delta$ to one that contains $k \geq 1$ instances of a. Once intersected with $GW_0$, this automaton can be used to express the belief that given a certain input NL, a is unlikely to appear in the output.

The automaton in the middle expresses the opposite belief. Here, the exit weight associated with the final (also initial) state 0 is $\eta \ll 1$. This automaton gives a weight 1 to any sequence that contains a, but a weight $\eta$ to sequences that do not. Once intersected with $GW_0$, this automaton expresses the belief that given the input NL, a is likely to appear in the output.

The automaton on the right is a simple illustration of the kind of prior beliefs that could be expressed on output sequences, independently of the input. Here, $\gamma_x$ denotes the unigram probability of the output symbol x. In the context of semantic parsing, such automata on the output could be used to express certain forms of regularities on expected logical forms, such as, like here, unigram probabilities that are not handled by the grammar $GW_0$ (which is concerned only by well-formedness constraints), or more generally, observations about certain patterns that are likely or unlikely to occur in the logical forms (e.g., the unlikeness of mixing basketball players with scientific authors), insofar as such regularities can be reasonably expressed in finite-state terms.

The question arises, "Why automata?" In order to be effective, the background b has to be able to provide the rnn component with useful information on the next incremental step, conditional on the already generated prefix. In addition, we would like the background to capitalize on different sources of information.

In connection with these desiderata, WCFG and WFSAs have the following remarkable properties: (1) the intersection of several WFSAs is a WFSA which can be efficiently computed; (2) the intersection of a WCFG with a WFSA is a WCFG which can be efficiently computed; and (3) given a prefix, the conditional probability of the next symbol relative to a WCFG (resp. a WFSA) can be efficiently computed; here, "efficiently computed" means through Dynamic Programming and in polynomial time. These properties are conspicuously absent from most other generative devices. For instance, it is far from obvious how to intersect two different RNNs to compute the conditional probability of the next symbol, given a common prefix: while a certain symbol may have a large probability relative to both RNNs, the later (global) consequences of choosing this next symbol may be largely incompatible between the two RNNs; in other words, the local combined conditional probability cannot be computed solely on the basis of the product of the two local conditional probabilities.

The fact that one can intersect a WCFG with a WFSA to produce another WCFG is a generalization of the classical result [concerning the non-weighted case]. The implementation we use is that of Wilker Aziz, which is based on the Earley-inspired intersection algorithm, obtaining a certain WCFG, which we normalize into probabilistic form, finally obtaining a PCFG $GW_{NL}$. In order to compute the background $b(x_{t+1}|x_1, \ldots, x_t, NL)$, we then need to compute the conditional probability relative to $GW_{NL}$ of producing the symbol $x_{t+1}$ given the prefix $x_1, \ldots, x_t$. There are some special purpose algorithms for doing that efficiently, but in this work we use again (unoptimally) the generic Earley intersection algorithm, taking advantage of the fact that the probability mass relative to $GW_{NL}$ of the set of sequences starting with the prefix $x_1, \ldots, x_t, x_{t+1}$ can be obtained by intersecting $GW_{NL}$ with the automaton generating the language of all sequences starting with this prefix.

The original Overnight dataset is a valuable data resource for studying semantic parsing as the dataset contains various domains focusing on different linguistic phenomena; the utterances in each domain are annotated both with logical forms (LFs) and canonical forms (CFs). However, this dataset has two main drawbacks: 1) it contains too few entities compared to real datasets and 2) most of the LFs in test are already seen during training. In consequence, the results achieved on this dataset by different systems are probably too optimistic.

To remedy these issues, we can construct an extended Overnight+ dataset. First, we group all the data and propose a new split. This split makes a 20%-80% random split on all the LFs and keeps the 20% LFs (together with their corresponding utterances) as test and the remaining 80% as training. Thus, LFs seen in test are guaranteed to not be seen during training. For each domain, we also add new named entities into the knowledge base and create a new development set and test set containing those new named entities. Depending on the domain, the number of annotated utterances varies from 800 to 4000 and we eliminate some erroneous annotations from the training set. All the reported experiments are conducted on Overnight+.

For our BRNN, the background b can be composed of a WCFG factor ($GW_0$) and depending on the input, zero to several WFSA factors favoring the presence of certain entities. In one experimental embodiment, we only employ automata that have the same topology as the automaton shown in the middle of FIG. 2 where the output vocabulary includes rule names (e.g. s0, np1) and where the weight η is chosen in [0, 0.0001, 0.01] based on the results obtained on the development set.

Currently, we detect only named entities and dates by using mostly exact string matching (e.g., if we detect 'alice' in the input, we construct an automaton to favor its presence in the LF), as well as a small amount of paraphrasing for dates (e.g., we detect both 'jan 2' (CF) and 'january 2' as January 2nd). In some experimental embodiments, we use a library developed by Wilker Aziz for performing the intersection between WFSA(s) and WCFG. The intersection algorithm results in a new WCFG, from which the background is computed through prefix-conditional probabilities as discussed herein.

In some experimental embodiments, we can adopt the same neural network architecture as Xiao et al., 2016, and can represent the NL semantics by a vector $u_b$ calculated from the concatenation of a vector $u_1$ encoding the sentence at the level of unigrams and another vector $u_2$ at the level of bigrams. Dropout can be applied to $u_1$ (0.1) and $u_2$ (0.3). We can model the DS up to time t with the vector $u_t$ generated by an LSTM. We can concatenate $u_t$ and $u_b$ and pass the concatenated vector to a two-layer MLP for the final prediction. At test time, we can use a uniform-cost search algorithm to produce the DS with the highest probability. All the models can be trained for 30 epochs.

Table 1 shows the results of different systems. The best average accuracy is achieved by our proposed system BDSP-CL. The system largely improves (48.8% over 34.5% in accuracy) over its RNN baseline DSP-CL, which does not have input-dependent WFSA factors. Our system also improves largely over SPO (no-lex), i.e., SPO without "alignment features" (this system still has a rich feature set including string matching, entity recognition, POS tagging, denotation, etc.). In average, BDSP-CL also performs better than the system noted SPO* (e.g., see https://github.com/percylianq/sempre/tree/master/overnight) with the full set of features, but to a more moderate extent. However, the results of this SPO* may be too optimistic: the so-called "alignment features" of SPO were obtained from a provided alignment file based on the original Overnight training dataset and not on the correct Overnight+, because we did not have access to easy means of recomputing this alignment file. The implication is that those features were calculated in a situation where most of the test LFs were already seen in training as explained herein, possibly unfairly helping SPO* on the Overnight+ test set.

We can explore predictions of BDSP-CL and SPO (no-lex) in an attempt to understand why our system may still sometimes be inferior. Table 2 shows some typical cases we observed. Because our current implementation of automata is limited to taking into account prior knowledge regarding only named entities and dates, our BDSP-CL can miss some important indications. For example, consider the sentence 'what locations are the fewest meetings held.' The disclosed model can predict a set of meetings while SPO (no-lex) can detect through its features that the question asks about locations. The disclosed model seems better at discovering regularities in the data for which SPO (no-lex) may not have predefined features. For example, for the sentence 'which men are 180 cm tall,' our model can successfully detect that the question asks about males.

TABLE 1

| New split | Basketball | Social | Publication | Calendar | Housing | Restaurants | Blocks | Avg |
|---|---|---|---|---|---|---|---|---|
| SPO (no-lex) | 42.2 | 3.1 | 33.1 | 38.8 | 31.0 | 65.4 | 32.1 | 35.1 |
| SPO* | 47.4 | 40.4 | 43.4 | 56.6 | 30.7 | 67.8 | 37.0 | 46.2 |
| DSP-CL | 51.0 | 49.7 | 15.2 | 22.5 | 28.7 | 58.7 | 15.9 | 34.5 |
| BDSP-CL | 63.0 | 57.3 | 25.5 | 36.4 | 60.7 | 64.3 | 34.7 | 48.8 |

Table 1 depicts experimental test results over all the domains on Overnight+. The numbers reported correspond to the proportion of cases in which the predicted LF is interpretable against the KB and returns the correct answer. DSP-CL is the model introduced in Xiao et al., 2016 that guarantees the grammaticality of the produced DS. BDSP-CL is our model integrating various factors (e.g., WCFG, WFSA) into the background. SPO (no-lex) is a feature-based system [see Wang et al., 2015] where we deactivate alignment features. SPO* is the full feature-based system but with unrealistic alignment features (explained previously) and thus should be seen as an upper bound of full SPO performance.

TABLE 2

| sentence | BDSP-CL | SPO(no-lex) |
|---|---|---|
| 'what locations are the fewest meetings held' | 'meetings that has the least number of locations' | 'location that is location of the least number of meeting' |
| 'which men are 180 cm tall' | 'person whose gender is male whose height is 180 cm' | 'person whose height is at least 180 cm' |
| 'which player played fewer than three games' | 'player whose number of played games (over a season) is less than 3' | 'player that has the smallest number of played games (over a season)' |

Table 2 illustrates prediction examples of BDSP-CL and SPO (no-lex). For readability concerns, instead of showing the predicted LF, we show the equivalent CF. The correct predictions are noted in italics.

TABLE 3

|  | DSP-CL | BDSP-CL |
| --- | --- | --- |
| Avg. KL-divergence | 3.13 | 1.95 |

Table 3 illustrates data indicative of the average KL-divergence to the uniform distribution when models predict rules corresponding to named entities.

If our background is in average closer to the true distribution compared to the uniform distribution, we hypothesize that the RNN will learn to predict a more uniform distribution compared to an RNN without a background. To test this hypothesis, we randomly sampled 100 distributions in the housing domain when the RNN needs to predict a rule corresponding to a named entity. We calculated the average KL-divergence from these distributions to the uniform distribution and report the results in Table 3. The results seem to confirm our hypothesis: the KL-divergence is much smaller for BDSP-CL where a background takes into account the presence of certain named entities depending on the input.

The disclosed work makes important extensions over the work of Xiao et al., 2016. While Xiao et al., 2016 incorporate grammatical constraints into RNN models, we incorporate additional prior knowledge about input dependency. We propose to take into account the well-formedness of LFs by a WCFG and depending on the input, take into account the presence of certain entities inside LFs by WFSA(s). We choose to use WFSA modeling our input-dependent prior knowledge as the algorithm of intersection can efficiently combine WCFG and WFSA(s) to form the background priors guiding the RNN.

Taking into account prior knowledge about named entities is common in more traditional, symbolic semantic parsing systems. We propose to incorporate those knowledge into an RNN-based model. This is arguably more principled than prior approaches that incorporate such knowledge into an RNN using data augmentation. The intersection algorithm used to compute the background allows local weight changes to propagate through the grammar tree thereby influencing the weight of each node inside the tree. This is related to the recent reinforcement learning research for semantic parsing where rewards are propagated over different action steps.

More generally, our work involves incorporating prior knowledge into deep learning models. This can be accomplished using symbolic objects such as grammar and automata. In contrast, some approaches model prior knowledge over the structure of the problem by combining hierarchical Bayesian models and deep models while other techniques handle prior knowledge that can be expressed by first-order logic rules and uses these rules as a teacher network to transfer knowledge into deep models.

We propose to incorporate a symbolic background prior into RNN based models to learn a semantic parser taking into account prior knowledge about LF well-formedness and about the likelihood of certain entities being present based on the input. We use a variant of a classical dynamic programming intersection algorithm to efficiently combine these factors and show that our Background-RNN yields promising results on Overnight+. In the future, the present inventors plan to explore the use of WFSA(s) with different topologies to model further prior knowledge.

Figure 3:
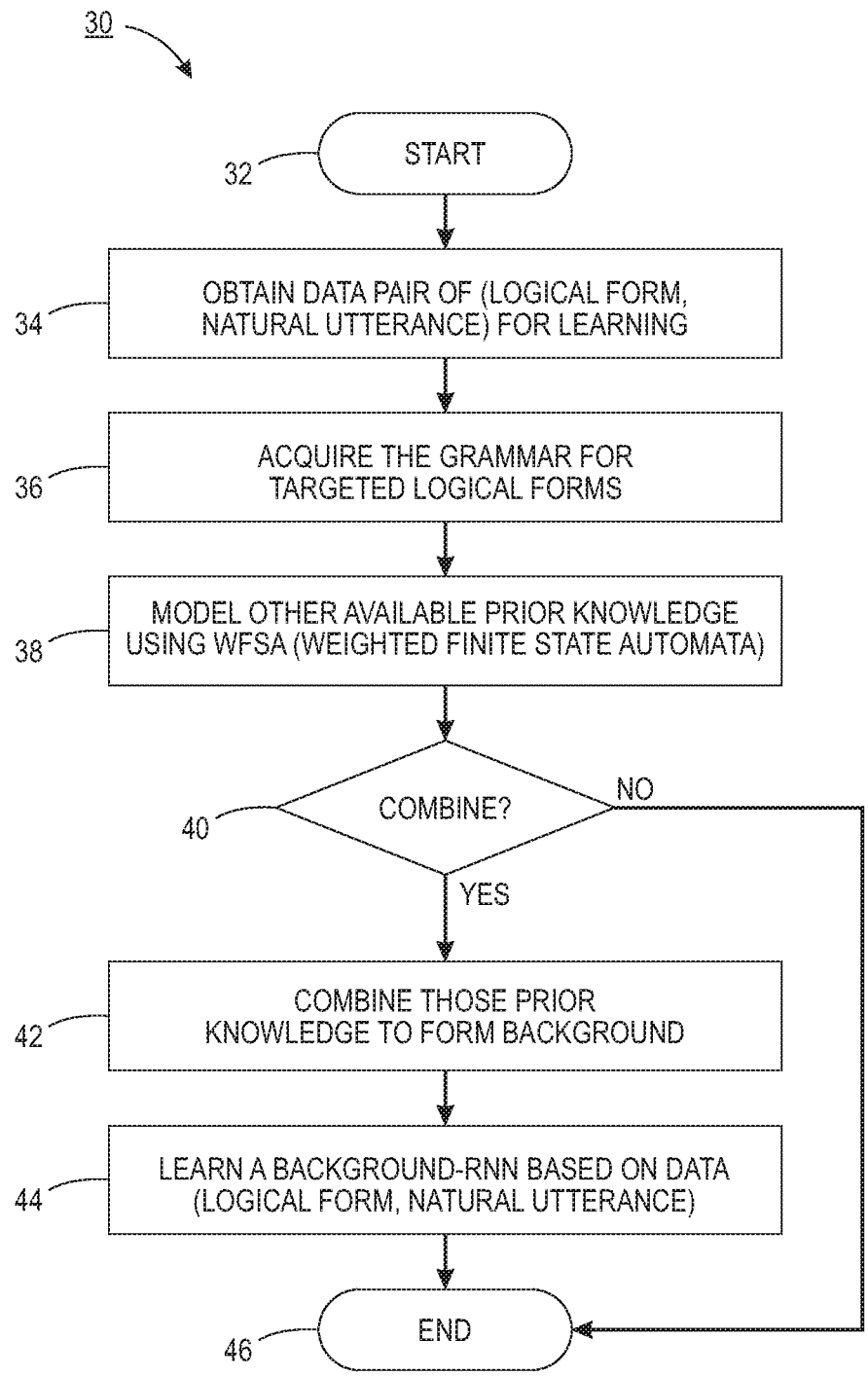
FIG. 3 illustrates a flow chart of operations depicting logical operational steps of a method for recurrent neural network based semantic parsing, in accordance with an example embodiment.

The aforementioned techniques can be summarized in the context of a flow chart of operations. That is, FIG. 3 illustrates a flow chart of operations depicting logical operational steps of a method 30 for recurrent neural network based semantic parsing, in accordance with an example embodiment. Method 30 describes a process for building a semantic parser. As indicated at block 32, the process begins. Thereafter, as indicated at block 34, a step, operation, or instruction can be implemented for obtaining a data pair of (logical form, natural utterance) for learning. Next, as shown at block 36, a step, operation, or instruction can be implemented for acquiring the grammar for targeted logical forms. Next, as depicted at block 38, a step, operation, or instruction can be implemented for modeling other available prior knowledge using WFSA (Weighted Finite State Automata). Then, as indicated at decision block 40, a step, operation, or instruction can be implemented for determining whether such prior knowledge should be combined to form a background (i.e., see previous discussion re: the background). If not, then the process ends, as indicated at block 46. If so, then as indicated at block 42, a step, operation, or instruction can be implemented to combine the aforementioned prior knowledge to form the background. Thereafter, as described at block 44, a step, operation, or instruction can be implemented to learn a background-RNN based on data (logical form, natural utterance). The process can then end, as indicated at block 46.

As indicated previously, Seq2seq models based on Recurrent Neural Networks (RNNs) have recently received a lot of attention in the domain of Semantic Parsing. While in principle they can be trained directly on pairs (natural language utterances, logical forms), their performance is limited by the amount of available data. To alleviate this problem, a technique such as method 30 can be implemented to exploit various sources of prior knowledge: the well-formedness of the logical forms is modeled by a weighted context-free grammar; the likelihood that certain entities present in the input utterance are also present in the logical form is modeled by weighted finite-state automata. The grammar and automata are combined together through an efficient intersection algorithm to form a soft guide to the RNN (this soft guide can be referred to as "background"). As indicated previously, this method has been tested on an extension of the Overnight dataset of Wang et al., 2015. Such experiments have demonstrated that this method not only strongly improves over an RNN baseline, but also outperforms non-RNN models based on rich sets of hand-crafted features.

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
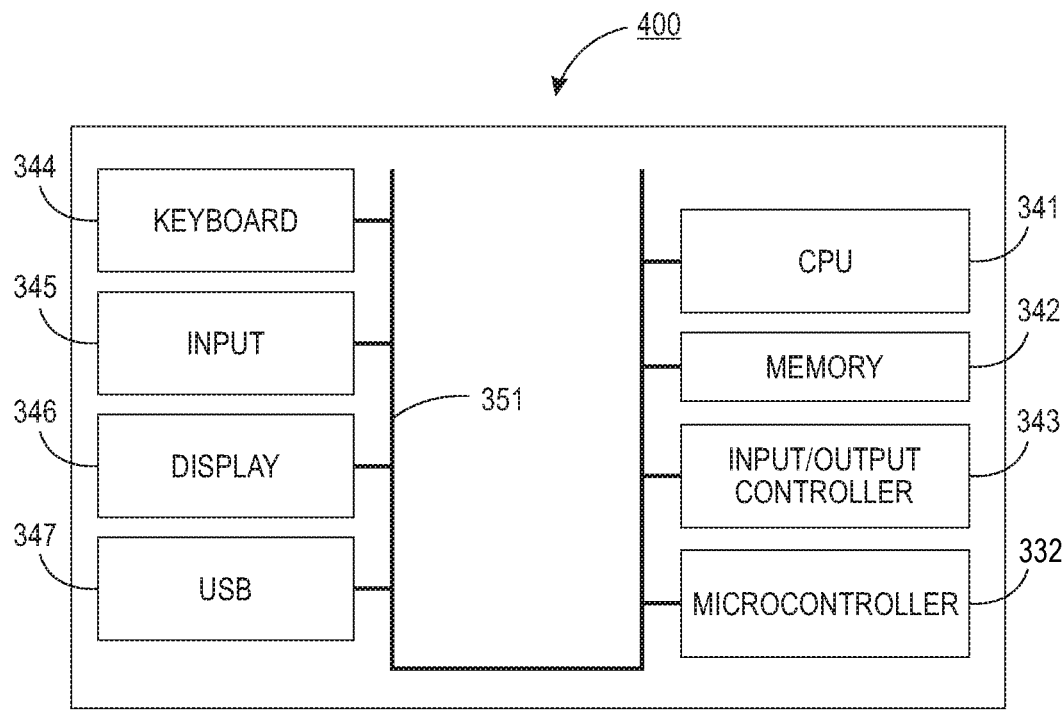
FIG. 4 illustrates a schematic view of a computer system/apparatus, in accordance with an example embodiment.
Figure 5:
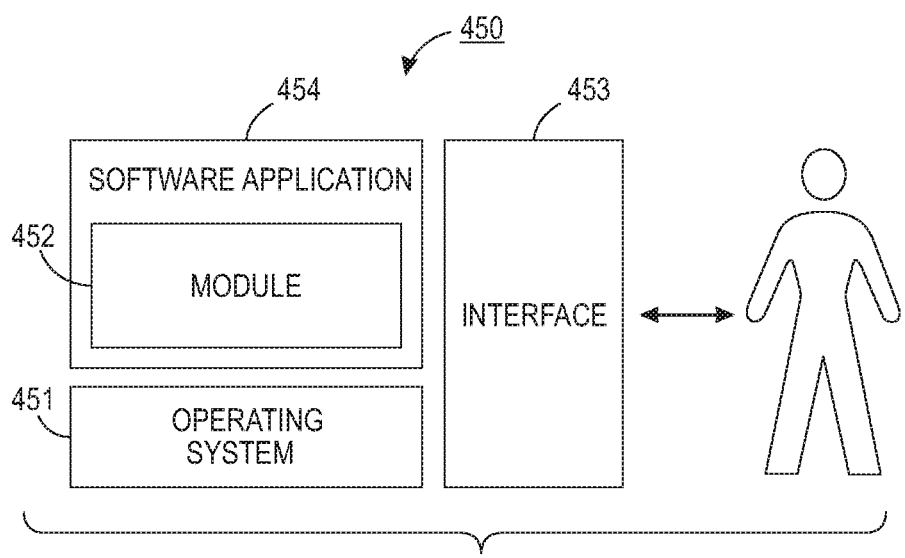
FIG. 5 illustrates a schematic view of a software system including a module, an operating system, and a user interface, in accordance with an example embodiment.

FIGS. 4-5 are shown only as exemplary diagrams of data-processing environments in which example embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server).

In some example embodiments, data-processing system/apparatus 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc.).

FIG. 5 illustrates a computer software system/apparatus 450 for directing the operation of the data-processing system/apparatus 400 depicted in FIG. 4. Software application 454, stored for example in memory 342, can include a module 452. The computer software system/apparatus 450 generally includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user may supply additional inputs or terminate a session. The software application 454 can include module(s) 452, which can, for example, implement the various instructions or operations such as those discussed herein with respect to FIGS. 1-3 herein. Module 452 may also be composed of a group of modules or sub-modules that implement the various steps, operations, instructions, and methodologies discussed herein with respect to FIGS. 1-3.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 4-5 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The claims, description, and drawings of this application may describe one or more of the instant technologies in operational/functional language, for example, as a set of operations to be performed by a computer. Such operational/functional description in most instances can be specifically configured hardware (e.g., because a general purpose computer in effect becomes a special-purpose computer once it is programmed to perform particular functions pursuant to instructions from program software). Note that the data-processing system/apparatus 400 discussed herein may be implemented as special-purpose computer in some example embodiments.

In some example embodiments, the data-processing system/apparatus 400 can be programmed to perform the aforementioned particular instructions (e.g., such as the various steps and operations described herein with respect to FIGS. 1-3) thereby becoming in effect a special-purpose computer). In other example embodiments, the data-processing system/apparatus 400 may be implemented in the context of a general-purpose computer. In yet other example embodiments, the data-processing system/apparatus 400 may be a combination of a general-purpose computer and a special-purpose computer.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein can be a distillation of machine specifications or other physical mechanisms specified by the operations/functions such that the otherwise inscrutable machine specifications may be comprehensible to the human mind. The distillation also allows one skilled in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, Java, Visual Basic, etc.), or tools in the form of Very high speed Hardware Description Language ("VHDL," which is a language that uses text to describe logic circuits)—are generators of static or sequenced specifications of various hardware configurations. The broad term "software sometimes obscures this fact" but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a micro architecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one skilled in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognized that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc., with natural language simply cannot be taken as an indication that such functional/operational technical descriptions are abstract ideas, or mere expressions of abstract ideas. In fact, as outlined herein, in the technological arts this is simply not true. When viewed through the tools available to those skilled in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person skilled in the art in understanding the described subject matter by providing a description that is more or less independent of any specific vendor's piece(s) of hardware.

The use of functional/operational technical descriptions assists the person skilled in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person skilled in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those skilled in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one skilled in the art can readily understand and apply in a manner independent of a specific vendor's hardware implementation.

At least a portion of the devices or processes described herein can be integrated into an information processing system/apparatus. An information processing system/apparatus generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed.

For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc., in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats.

However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and/or firmware would be well within the skill of one skilled in the art in light of this disclosure.

In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for semantic parsing, said method comprising:
obtaining a data pair for learning, said data pair comprising logical form data and natural utterance data;
acquiring grammar for targeted logical forms among said logical form data of said data pair;
modeling data comprising other available prior knowledge using WFSA (Weighted Finite State Automata);
combining said targeted logical forms with said data to form a background after said modeling of said data comprising said other available prior knowledge; and
automatically learning a background-RNN (Recurrent Neural Network) based on said data pair, wherein said background-RNN comprises a combination of an RNN with a background.

2. The method of claim 1 further comprising implementing said background as an input-dependent background.

3. The method of claim 1 wherein for said background-RNN, said background comprises a WCFG (Weighted Context-Free Grammar) factor.

4. The method of claim 1 further comprising implementing said background as an input-dependent background through said WFSA.

5. The method of claim 4 further comprising intersecting said WFSA with a WCFG (Weighted Context-Free Grammar) representing valid grammar derivations, wherein a result of said intersecting said WFSA with said WCFG is a new WCFG that is normalized into a PCFG (Probabilistic CFG) that renders explicit a group of conditional probabilities for varying techniques in which a given derivation sequence can be continued when making a next local choice, so that said RNN only has to learn to correct choices of said PCFG.

6. The method of claim 1 further comprising:
implementing said background as an input-dependent background through said WFSA; and
intersecting said WFSA with a WCFG (Weighted Context-Free Grammar) representing valid grammar derivations, wherein a result of said intersecting said WFSA with said WCFG is a new WCFG that is normalized into a PCFG (Probabilistic CFG) that renders explicit a group of conditional probabilities for varying techniques in which a given derivation sequence can be continued when making a next local choice, so that said RNN only has to learn to correct choices of said PCFG.

7. The method of claim 6 further comprising utilizing a dynamic programming intersection algorithm for said intersecting said WFSA with said WCFG.

8. A system for semantic parsing, said system comprising:
at least one processor; and
a non-transitory computer-usable medium embodying computer program code, said computer-usable medium capable of communicating with said at least one processor, said computer program code comprising instructions executable by said at least one processor and configured for:
obtaining a data pair for learning, said data pair comprising logical form data and natural utterance data;
acquiring grammar for targeted logical forms among said logical form data of said data pair;
modeling data comprising other available prior knowledge;
combining said targeted logical forms with said data to form a background after said modeling of said data comprising said other available prior knowledge using WFSA (Weighted Finite State Automata); and
automatically learning a background-RNN (Recurrent Neural Network) based on said data pair, wherein said background-RNN comprises a combination of an RNN with a background.

9. The system of claim 8 wherein said instructions are further configured for implementing said background as an input-dependent background.

10. The system of claim 8 wherein for said background-RNN, said background comprises a WCFG (Weighted Context-Free Grammar) factor.

11. The system of claim 10 wherein said instructions are further configured for implementing said background as an input-dependent background through said WFSA.

12. The system of claim 11 wherein said instructions are further configured for intersecting said WFSA with a WCFG (Weighted Context-Free Grammar) representing valid grammar derivations, wherein a result of said intersecting said WFSA with said WCFG is a new WCFG that is normalized into a PCFG (Probabilistic CFG) that renders explicit a group of conditional probabilities for varying techniques in which a given derivation sequence can be continued when making a next local choice, so that said RNN only has to learn to correct choices of said PCFG.

13. The system of claim 10 wherein said instructions are further configured for:
implementing said background as an input-dependent background through said WFSA; and
intersecting said WFSA with a WCFG (Weighted Context-Free Grammar) representing valid grammar derivations, wherein a result of said intersecting said WFSA with said WCFG is a new WCFG that is normalized into a PCFG (Probabilistic CFG) that renders explicit a group of conditional probabilities for varying techniques in which a given derivation sequence can be continued when making a next local choice, so that said RNN only has to learn to correct choices of said PCFG.

14. The system of claim 13 wherein said instructions are further configured for utilizing a dynamic programming intersection algorithm for said intersecting said WFSA with said WCFG.

15. A non-transitory processor-readable medium storing computer code representing instructions to cause a process for semantic parsing, said computer code comprising code to:
obtain a data pair for learning, said data pair comprising logical form data and natural utterance data;
acquire grammar for targeted logical forms among said logical form data of said data pair;
model data comprising other available prior knowledge using WFSA (Weighted Finite State Automata);
combine said targeted logical forms with said data to form a background after said modeling of said data comprising said other available prior knowledge; and
automatically learn a background-RNN (Recurrent Neural Network) based on said data pair, wherein said background-RNN comprises a combination of an RNN with a background.

16. The processor-readable medium of claim 15 wherein said code further comprises code to implement said background as an input-dependent background.

17. The processor-readable medium of claim 15 wherein for said background-RNN, said background comprises a WCFG (Weighted Context-Free Grammar) factor.

18. The processor-readable medium of claim 17 wherein said code further comprises code to implement said background as an input-dependent background through said WFSA.

19. The processor-readable medium of claim 18 wherein said code further comprises code to intersect said WFSA with a WCFG (Weighted Context-Free Grammar) representing valid grammar derivations, wherein a result of said intersecting said WFSA with said WCFG is a new WCFG that is normalized into a PCFG (Probabilistic CFG) that renders explicit a group of conditional probabilities for varying techniques in which a given derivation sequence can be continued when making a next local choice, so that said RNN only has to learn to correct choices of said PCFG.

20. The processor-readable medium of claim 17 wherein said code further comprises code to:
implement said background as an input-dependent background through said WFSA; and
intersect said WFSA with a WCFG (Weighted Context-Free Grammar) representing valid grammar derivations, wherein a result of said intersecting said WFSA with said WCFG is a new WCFG that is normalized into a PCFG (Probabilistic CFG) that renders explicit a group of conditional probabilities for varying techniques in which a given derivation sequence can be continued when making a next local choice, so that said RNN only has to learn to correct choices of said PCFG.

* * * * *